United States Patent [19]

Miyao

[11] Patent Number: 4,525,832
[45] Date of Patent: Jun. 25, 1985

[54] DIGITAL SIGNAL TRANSMISSION SYSTEM

[75] Inventor: Fumio Miyao, Ebina, Japan

[73] Assignee: Fuji Xerox Co., Ltd., Tokyo, Japan

[21] Appl. No.: 509,215

[22] Filed: Jun. 29, 1983

[30] Foreign Application Priority Data

Jul. 7, 1982 [JP] Japan .................................. 57/116811
Jul. 14, 1982 [JP] Japan .................................. 57/121229

[51] Int. Cl.³ .............................................. H04J 3/02
[52] U.S. Cl. .......................................... 370/85; 370/94
[58] Field of Search ............................. 370/85, 94, 60; 340/825.5

[56] References Cited

U.S. PATENT DOCUMENTS 4,063,220 12/1977 Metcalfe et al. ..................... 340/147
4,156,112 5/1979 Moreland ............................. 370/85
4,234,952 11/1980 Gable et al. .......................... 370/85
4,412,326 10/1983 Limb ..................................... 370/85
4,432,088 2/1984 Frankel ................................. 370/85
4,434,421 2/1984 Baker et al. .......................... 370/85

FOREIGN PATENT DOCUMENTS 57-154956 9/1982 Japan .
58-75349 5/1983 Japan .
58-75348 5/1983 Japan .

Primary Examiner—Douglas W. Olms
Assistant Examiner—Kenneth I. Rokoff
Attorney, Agent, or Firm—Kinney & Lange

[57] ABSTRACT

In a digital signal transmission system for effecting time-division multiplexing/circuit switching transmission of data in the form of packets by means of transmission cable, a method for the synchronization of system timing which permits the establishment of system timing such as the synchronization of frames and blocks is improved.

For this purpose, all of the individual personal stations in the transmission system have their own respective distance codes, and only the master station incorporates the distance code of transmitting personal station in its master packet, and the other personal stations than the master station independently calculate their own timing for sending out packets on the basis of the aforementioned data to establish their own system timing.

12 Claims, 12 Drawing Figures

DIGITAL SIGNAL TRANSMISSION SYSTEM

BACKGROUND OF THE INVENTION

1. Field of the Invention

This invention relates to a digital signal transmission system for effecting time-division multiplexing/circuit switching data transmission by the use of a transmission cable.

More particularly, this invention relates to a digital signal transmission system effecting by an improved method the synchronization of system timing required for the purpose of controlling the timing of issuance of packet signals from individual personal stations for transfer on a transmission cable.

2. Description of the Prior Art

The dissemination of electronic computers and the growth of digital signal processing techniques have recently culminated in successful combination of communication systems with data processing systems and perfection of data communications devoted to on-line data processing. These achievements are attracting mounting public interest and respect.

Particularly in the small-scale communication systems such as for the intraorganizational communication confined within the premises of a government or public office or of a private corporation, the system which effects communication in the form of packets by means of a transmission cable such as a coaxial cable is aresting particularly keen interest owing to its features such as good economy, high reliability, and prominent efficiency of transmission.

This communication system which makes use of packets requires installation, as in laboratories, of transmission cables adapted to effect transmission in both directions and connection to these transmission cables of numerous personal stations. From these personal stations, messages divided into data blocks each of 1000 to 2000 bits, for example, are transmitted through the transmission cables. The individual messages are each prefixed with a header covering such information as address and serial number.

In the communication system of this nature, the network itself is a passive transmission medium totally devoid of any control function and the individual personal stations have such control functions thoroughly distributed among themselves.

At a given personal station, therefore, transmission of a message is started when an idle channel is available in the cables. When a packet of message transmitted from one personal station collides with a packet of message transmitted from another personal station, these two personal stations discontinue the transmission of their messages. The personal station which has discontinued the transmission, on elapse of a random queuing time, tries to resume the transmission of the message.

In the communication system of this operating principle, users posted near the personal stations enjoy access to a common computer to which the communication system is interfaced. They are also able to have common use, through the medium of this communication system, of various items of hardware such as memory devices and various items of software such as programs distributed throughout the organization.

The devices such as high-speed or high-resolution printers and large-capacity files which are concentrated at the large-scale central processing unit in the time-sharing system can be used in the communication system as widely distributed within the premises of a given organization.

The communication system, therefore, enables the user to enjoy economization of resources and improvement in efficiency of utility. Besides, it warrants ample flexibility of programs and data and promises development of an intensive software system.

Further, the communication system of this nature has an advantage that all the personal stations are equally entitled to the use of channels, namely no special personal station has priority on the use of a channel over the remainders. This means that the present communication system does not have the hierarchical relationship often found among the personal stations in communication systems of other operating principles, so that communication can be established between two freely connected personal stations.

It has another advantage that the system can be easily designed in a highly reliable network because the component channels such as of coaxial cables are invariably formed of completely passive circuits.

Although this communication system enjoys various features as described above, it has a possibility of suffering packets issuing from different personal stations to collide with each other on one and the same channel because the individual personal stations of the system are allowed to start sending out data at any time desired. The frequency of the collision between packets will naturally become conspicuous in proportion as the system's efficiency in the use of channels is heightened.

As a solution of this problem, the signal transmission systems called Priority Ethernet and Reservation Ethernet have been proposed [by Japanese Patent Application No. SHO 56(1981)-38714 and No. SHO 56(1981)-172895, for example].

The Priority Ethernet system, by means of preambles in packets, assigns degrees of priority to signals to be transmitted from individual personal stations. If two packets from different personal stations happen to collide with each other, the signals in a packet of higher priority are allowed to be transmitted preferentially over those in the other packet of lower priority.

The Reservation Ethernet system maintains a master station for designation of modes and causes this master station, while in the reservation mode, to check all the other personal stations and confirm whether or not they have signals to be transmitted and, when certain personal stations are found to have signals to be transmitted, examine such personal stations and determine the amounts of their data for transmission.

On the basis of the results of this determination, the master station fixes the sequence in which the relevant packets will be transmitted by individual personal stations within a given frame and, in the transmission mode, causes the signals to be transmitted in the time-division pattern.

In accordance with the Priority Ethernet system, however, there still persists the problem that among a plurality of packets of equal degree of priority, dispersion is caused in the transmission delay time by collision.

Owing to this problem, this system proves unsuitable for real-time signal transmission such as for example, the voice transmission in the form of a conversation which attaches the greatest emphasis to the real-time relationship of response between transmission and reception.

In accordance with the Reservation Ethernet system, the presence of the master station deprives the personal stations of their mutual equality. This system suffers from poor reliability of performance because it has the possibility of ceasing to provide required data communication when the master station runs into trouble.

For the solution of the problem just mentioned, there has been proposed the modified Ethernet system which is capable of providing real-time transmission without depriving the personal stations of their mutual equality.

In accordance with this signal transmission system, the frames which are periodically repeated along time axis are each In accordance with this signal transmission system, the frames which are periodically repeated along time axis are each divided into a plurality of blocks along the time axis. With these blocks as the unit, this system provides the personal stations with chances for packet type communication.

In this signal transmission system, all the personal stations are equally entitled to the use of idle blocks. In case where a given personal station occupies a specific block over a duration necessary for signal transmission, that personal station is periodically given a chance for signal transmission in each of frames repeated on the time base. Thus, this system permits the personal stations to effect real-time transmission of signals by making use of the function described above.

Figure 1:
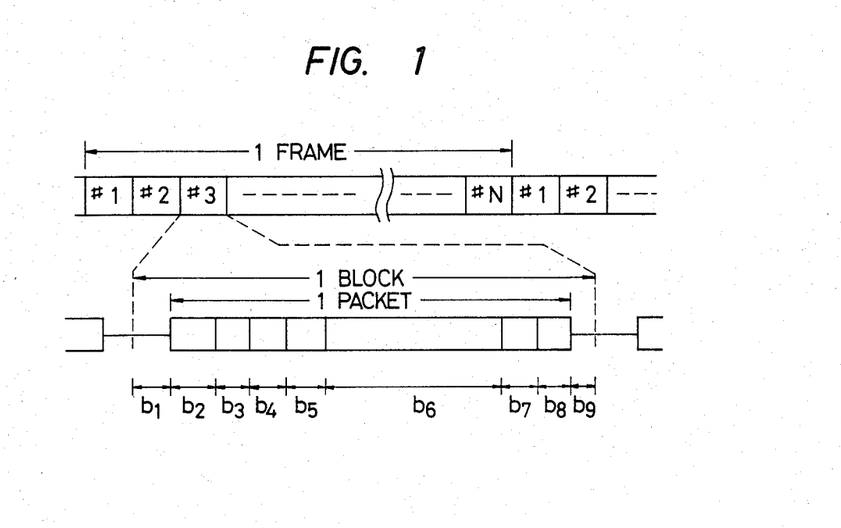
FIG. 1 is a diagram illustrating a typical data format of transmission signals for use in a digital signal transmission system which divides each of the frames periodically repeated along time axis into a plurality of unit blocks and allows signals to be transmitted in such blocks along the time axis.

One typical frame configuration for the signals to be used in the aforementioned digital signal transmission system is illustrated in FIG. 1.

Each of the frames which are repeated periodically on the time base consists of N blocks (#1 through #N). And each of the blocks consists of various bit rows, $b_1$ through $b_9$, as shown below.

$b_1$ ... Rear guard time
$b_2$ ... Preamble
$b_3$ ... Address bit
$b_4$ ... Distance code bit
$b_5$ ... Control bit
$b_6$ ... Data bit
$b_7$ ... Check bit
$b_8$ ... End flag
$b_9$ ... Front guard time The bit rows $b_2$ through $b_5$ and the bit rows $b_7$ and $b_8$ are essential components for a packet. These bit rows are collectively referred to as "overhead bits." The two bit rows, $b_1$ and $b_9$, are collectively referred to as the "guard time."

The term "guard time" means "empty bit rows" which are intended to preclude the situation in which packets in adjacent blocks may possibly be caused to overlap, if partially, owing to the delay time which occurs during the propagation of signals on a coaxial cable.

In the bit rows forming this guard time, the rear guide time $b_1$ serves to protect the trailing one of any two adjacent packets against the trouble of overlapping and the front guard time $b_9$ similarly to protect the leading packet against the trouble.

The sum of the number of bits of the rear guard time $b_1$, and that of bits of the front guard time $b_9$, will be represented as g bits and the guard time ($b_1 + b_9$) will be represented hereinafter as $T_g$.

In the digital signal transmission system proposed as described above, when none of the personal stations in the system is transmitting signal, all the personal stations have a chance, equally and at any time at all, to start sending out signals in the aforementioned frame configuration. Thus, the particular personal station which is the first to start sending out signal onto the transmission cable will take the initiative in the synchronization of frames.

Once the frame synchronization has been established as described above, all the personal stations are enabled to keep watch on the state of signals being transmitted on the transmission cable.

As will be described fully afterward, the user devices at the personal stations are each provided with a memory adapted to memorize the condition of occupation of individual blocks by signals in the frames. Thus, all the personal stations are allowed to register relevant blocks based on the incoming packet signals addressed to themselves.

After the particular personal station has established the frame synchronization, any of the other personal stations is allowed to send out packet signals by selecting empty blocks based on the information stored in the aforementioned memory and loading these empty blocks with packet signals desired to be transmitted.

In this case, the timing by which the personal stations are allowed to send out their own packet signals poses a problem.

Figure 2:
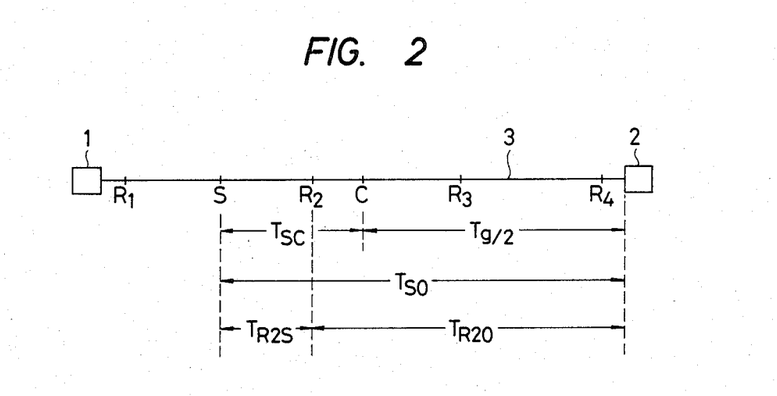
FIG. 2 is an explanatory layout diagram illustrating the manner of distribution of the personal stations on a coaxial cable.

For the sake of explanation, let us assume that, as illustrated in FIG. 2, a coaxial cable 3 has its opposite ends connected to impedance matching terminators 1, 2, a personal station C is located at the middle point of the coaxial cable 3, and a personal station S located between the personal station C and the terminal 1 is already in the process of transmitting signals on the coaxial cable 3.

In this case, the packet signals which are being sent out by the personal station S are received by the personal station C and the other personal stations, $R_1$ through $R_4$, on the coaxial cable 3 at different points of time, depending on the variation in the signal propagation delay time on the cable 3.

If the personal stations randomly send out their own signals without paying any respect to the other personal stations, then there is a fair possibility that the packets issuing from such personal stations will overlap (collide with) each other on the coaxial cable 3.

For the purpose of precluding this detestable phenomenon, the aforementioned signal transmission system makes effective use of the aforementioned concept of guard time $T_g$, in establishing the synchronization of system timing.

To be more specific, in this signal transmission system, the guard time $T_g$, is fixed at two or more times of the signal propagation delay time required to cover the distance between the centrally located personal station C, datum position, and the most distant personal station and the transmission of signals is effected so that, at the receiving point of the centrally located personal station C, the packets issuing from the individual personal stations will be arranged as separated by equal intervals.

Figure 3:
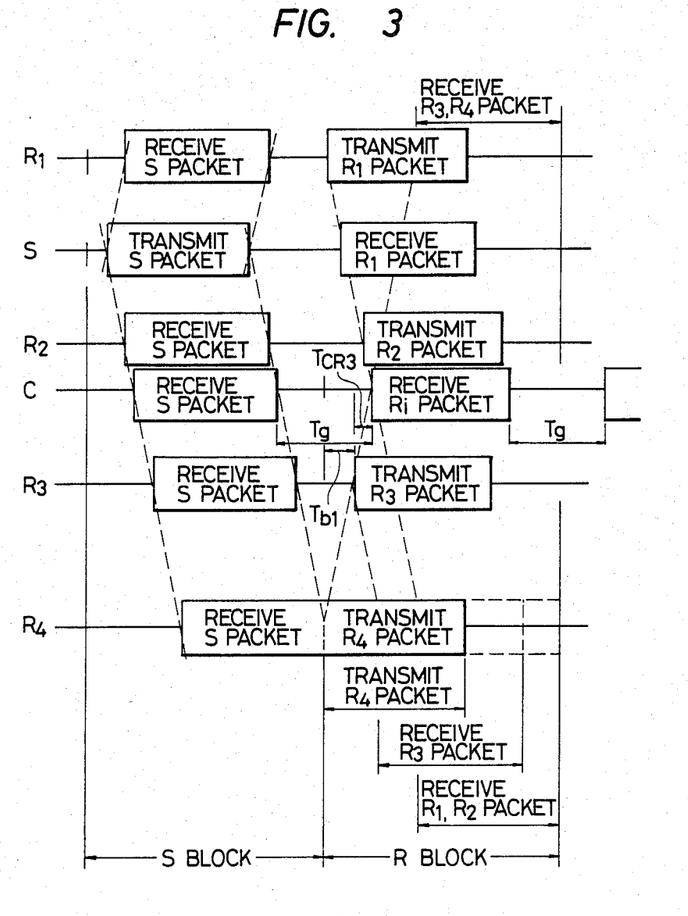
FIG. 3 is a timing diagram illustrating the envelope of signal waveform of transmission and reception packets at the point of reception (tap) of each of the personal stations illustrated in FIG. 2.

FIG. 3 provides more specific illustration of the working of the signal transmission system. The diagram depicts the system on the assumption that while the personal stations of the system are connected as illustrated in FIG. 2, the personal station S is already in the process of transmitting signals and the other personal stations, $R_1$ through $R_4$, are about to start sending out packet signals.

In this case, the personal stations $R_1$ through $R_4$ which follow the personal station S in the order of signal transmission determine their own points of timing for sending out their own transmission packets so that the personal station C, the datum point, will begin to receive the transmitted packets one guard time $T_g$, after the personal station C completes reception of the transmission packets (or transmission S packets) from the personal station S.

To determine such timing for the issuance of signals, the personal stations $R_1$ through $R_4$, on receiving the packet signals transmitted on the coaxial cable 3, first examine the address bits ($b_3$) of the received packet signals and discern the reception of packets from the personal station S (reception S packets).

Further, the personal stations $R_1$ through $R_4$, based on the signal propagation delay times between the personal station S, the centrally located personal station C, and their own stations, determine the points of time at which the arrival of reception S packets at the point of reception of the personal station C is completed.

These points of time, as illustrated in FIG. 3, are later than the points of time at which the reception of the reception S packets at the personal stations $R_1$ and $R_2$ is completed and earlier than the point of time at which the reception of the reception S packets at the personal stations $R_3$ and $R_4$ is completed.

After the personal stations $R_1$ through $R_4$ have determined the point of time at which the reception of reception S packets is completed with reference to the personal station C as the datum point, the particular one of these four personal stations which desired to send out signals begins to send out packet signals [or transmission $R_i$ packets (i=1 to 4)] at the point of time which is earlier than the determined point of time mentioned above by an interval equivalent to the signal propagation delay time required to cover the distance between its own station and the personal station C.

The packet signals which have been sent out as described above begin to be received (as reception $R_i$ packets) at the personal station C as the datum point after elapse of one guard time $T_g$, from the time of completion of the reception of reception S packets as illustrated in FIG. 3.

This adjustment of the timing for sending out signals is accomplished by establishing frame synchronization and block synchronization at all the personal stations concerned.

Specifically, the personal stations are adapted, as described fully afterward, to reset periodically at a fixed timing the frame counter and the block counter which take count of the clock signals fed out by their own oscillators. Because of this function, the personal stations are able to establish frame synchronization and block synchronization within the tolerance of frequency of the clock signals.

In a system constructed as illustrated in FIG. 2 and FIG. 3, for example, while the personal station S is transmitting S packets by using the first block #1, the personal stations $R_1$ through $R_4$ control the aforementioned counters and establish the frame and block synchronizations so that the second block #2, for example, will be started after elapse of the time $T_{b9}$, of the formula (1):

$$T_{b9} = T_g/2 + |T_g/2 - T_{SO}| - |T_{SO} - T_{RiO}| \tag{1}$$

Wherein i=1 to 4 from the point of time at which the reception of reception S packets is completed. The time $T_{b9}$ is hereinafter referred to as "front guard time".

In the aforementioned formula (1), $T_{SO}$ denotes the signal propagation delay time required to cover the distance between the reference end of the coaxial cable 3 (such as, for example, the terminal 2 in the diagram of FIG. 2) and the personal station S and $T_{RiO}$ denotes the signal propagation time required to cover the distance between the aforementioned end to the personal station $R_i$(i=1 to 4).

Evidently, therefore, the second term of the right member of the formula (1), $|T_g/2 - T_{SO}|$, denotes the signal propagation delay time required to cover the distance between the personal station C and the personal station S and the third term, $|T_{SO} - T_{RiO}|$, denotes the signal propagation delay time required to cover the distance between the personal station S and the personal station $R_i$.

To be more specific, the personal station $R_3$ which is located at a greater distance than the centrally located personal station C from the personal station S, for example, controls the aforementioned counters so that the second block #2, will be started on elapse of the time of the formula (2):

$$T_{b9} = T_g/2 - T_{CR3} \tag{2}$$

from the point of time at which the reception of reception S packets is completed. In this formula, $T_{CR3}$ denotes the signal propagation delay time required to cover the distance between the personal station C and the personal station $R_3$.

In the case of the personal station $R_2$ which is located between the personal station S and the personal station C, the front guard time $T_{b9}$, is calculated by the following formula (3).

$$T_{b9} = T_g/2 + T_{CR2} \tag{3}$$

In this formula, $T_{CR2}$ denotes the signal propagation delay time required to cover the distance between the personal station C and the personal station $R_2$.

In the case of the personal station $R_1$ which is located at a greater distance than the personal station S from the centrally located personal station C, the front guard time $T_{b9}$, is calculated by the following formula (4).

$$T_{b9} = T_g/2 + T_{SC} - T_{SR1} \tag{4}$$

In this formula, $T_{SC}$ denotes the signal propagation delay time required to cover the distance between the personal station S and the personal station C and $T_{SR1}$ that between the personal station S and the personal station $R_1$.

As described above, in the digital signal transmission system the front guard time $T_{b9}$, namely the interval between the time that the reception of packets sent out by the master station which takes the initiative in the frame synchronization (personal station S in the preceding illustration) (hereinafter referred to as "master packets") is completed and the time that the next block timing is started, is determined by each of the personal stations in accordance with the pertinent one of the aforementioned formulas, (1) through (4), using the relationship of position (or distance) with reference to the other personal station and the results are stored in the form of a conversion table in the memory device such as ROM (read only memory), for example.

This memory device is adapted so that when the code designating the transmitter of the master packet is injected into the memory device through the address designation terminal thereof, the memory device will feed out of its output terminal the signal corresponding to the front guard time $T_{b9}$.

When this signal is fed into the programmable timer and the output of the timer is used to reset the aforementioned counters of a given personal station, this personal station is enabled to establish frame synchronization and block synchronization. The term "programmable timer" as used herein means a general-purpose circuit of the type which issues a signal after elapse of an interval equivalent to the aforementioned front guard time from the time at which the circuit is started by the injection of a signal corresponding to the front guard time $T_{b9}$.

The adoption of such a method for the synchronization of system timing, however, evidently necessitates provision of conversion tables of dissimilar contents for the various personal stations. The contents of such conversion tables acceleratingly increase with the increasing number of personal stations involved in the system. The increase in the volume of contents of conversion tables, therefore, calls for great time and labor in the design and fabrication of memory devices such as ROM's which are used for storing such conversion tables. This fact has offered a great hindrance to the actual installation and operation of the communication system under discussion.

As a solution of this problem, there has been proposed a method which comprises causing distance codes which exclusively depend on signal propagation delay times between personal stations on the transmission cable to be included in advance in the address codes of packets to be sent out by personal stations and allowing the signal propagation delay time between two given personal stations to be calculated on the basis of the distance codes and the address codes.

In this method, the distance codes are transmitted as included in both the address number of the receiving personal station to which the packets are addressed and the address number of the transmitting personal station. At the receiving personal station, the calculation of the pertinent one of the aforementioned formulas (1) through (4) is performed on the basis of the two sets of distance codes.

In this case, since each of the personal stations is required to memorize distance codes of all the other personal stations against their corresponding address numbers, it must be provided with a memory device such as a ROM (read only memory) or RAM (random access memory), for example.

The provision of such memory devices for all the personal stations evidently entails a great addition to the cost of equipment. Moreover, when ROM's are adopted, a change in the location of any personal station necessitates replacement of the ROM's used at all the personal stations. This fact divests the system using ROM's of its economic feasibility.

When RAM's are adopted, a change made in the location of any personal station necessitates that particular personal station to cause the contents of the RAM's at all the other personal stations to be renewed wholly by the use of the transmission cable.

Further, the system must be provided with a proper backup power source (batteries) adapted to prevent the contents of such memory devices from being erased during a failure of the commercial power line.

SUMMARY OF THE INVENTION

This invention has been perfected with a view to overcoming the various problems suffered by the conventional system as described above. It is an object of this invention to provide, in a communication system of the type enabling the personal stations thereof independently to determine the timing for sending out packets, a method for the synchronization of system timing in a digital signal transmission system, which permits the establishment of system timing such as the synchronization of frames and the synchronization of blocks to be materialized without the use of conversion tables filled with data on relationship between the individual personal stations.

To accomplish the object described above, this invention contemplates causing the individual personal stations in the digital signal transmission system to own their respective distance codes and allowing the address codes of only the master packets to incorporate therein the distance codes of transmitting personal stations and thereby enabling the personal stations independently to calculate their own timing for sending out packets on the basis of the aforementioned data and, thus, materializing the establishment of system timing. In this case, a substantially middle point or a terminal point of the transmission cable is utilized as the datum point for the aforementioned distance codes.

BRIEF DESCRIPTION OF THE DRAWINGS

FIG. 5 (A) is a timing diagram illustrating a case wherein the transmission address code in a given packet coincides with that in the immediately preceding master packet and FIG. 5 (B) a timing diagram illustrating a case wherein such address codes fail to coincide.

DETAILED DESCRIPTION OF THE INVENTION

Now, the present invention will be described in detail below with reference to an embodiment illustrated in the drawing.

Figure 4:
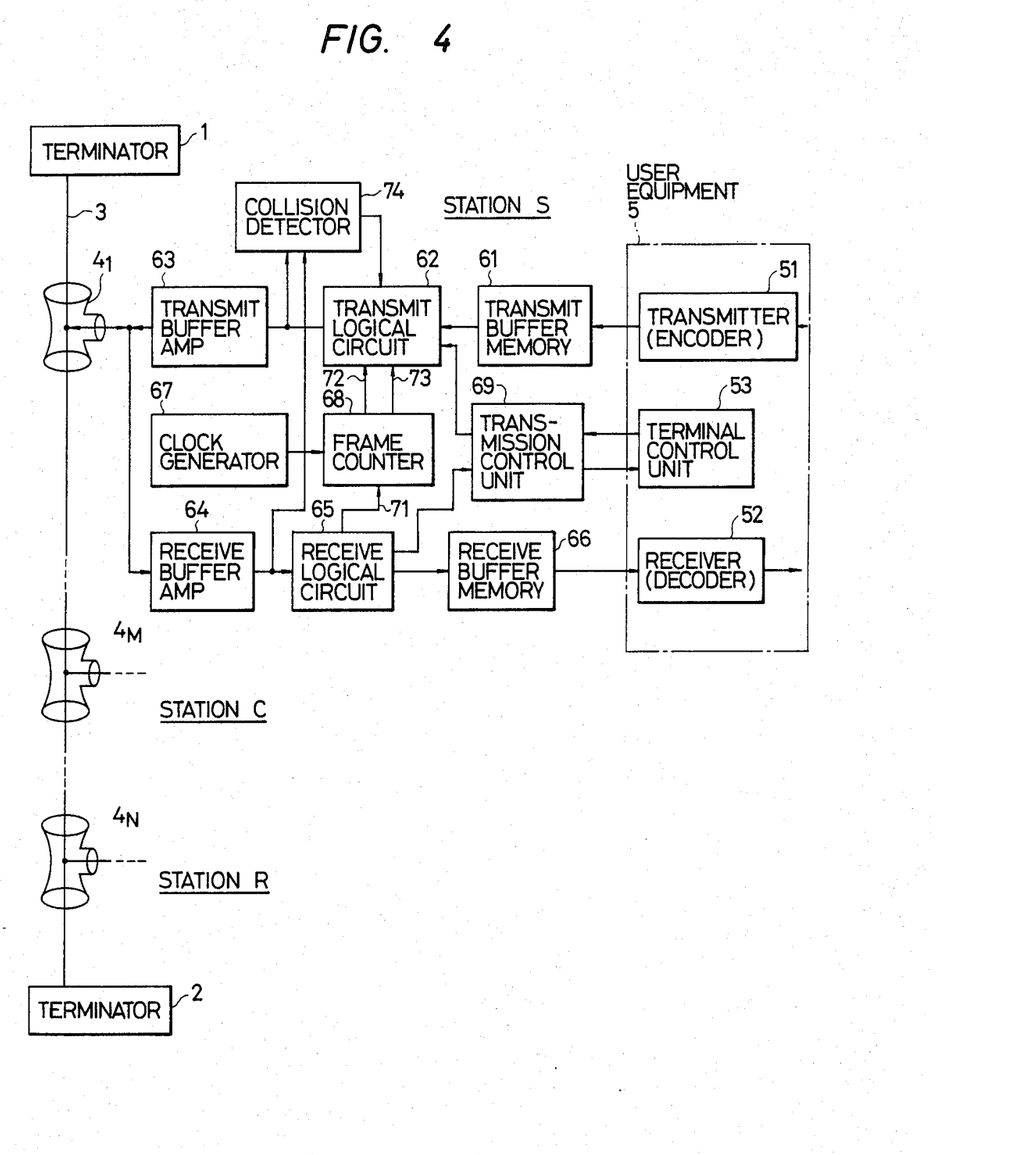
FIG. 4 is a block diagram illustrating in outline a communication system for embodying the present invention.

FIG. 4 represents in outline a communication system for materializing a typical digital signal transmission system of the present embodiment.

In this communication system, a coaxial cable 3 laid as a channel has its opposite ends connected to impedance-matching terminators 1, 2 having electrical resistance equal in magnitude to characteristic impedance of the said cable.

The personal stations are connected through the respective T connectors (taps), $4_1$-$4_N$, to the coaxial cable 3. All these personal stations have a basically identical structure. To avoid wasteful repetition, therefore, the essential components of the personal station, S, connected through the T connector $4_1$ are illustrated representatively in the diagram.

Each of the personal stations is provided with a user equipment 5 incorporating a computer and a telephone.

The user equipment 5 is further provided with a transmitter (encoder) 51 for transmitting digital signals of the unit of packets to some other personal station, a receiver (decoder) 52 for receiving digital signals of the unit of packets transmitted by some other personal station, and a terminal control unit 53 for controlling terminals.

The signals issued from the transmitter 51 are temporarily stored in a transmission buffer memory 61. The stored outgoing signals are then read out of the buffer memory 61 at a prescribed time by clock signals equalling the transmission speed on the coaxial cable 3 serving as a transmission medium. The signals thus read out are converted into packets of a prescribed pattern by a transmit logical circuit 62. These packets are sent through a transmit buffer amplifier 63 and forwarded via the T connector $4_1$ onto the coaxial cable 3.

All the packet signals which are being transmitted on the coaxial cable 3 are sent through the T connector $4_1$, received by a reception buffer amplifier 64, and supplied to a receive logical circuit 65.

The receive logical circuit 65 selects, out of all the incoming packets, only the packets addressed to its own personal station and puts the selected packets to temporary storage in a receive buffer memory 66. The packet signals thus kept in storage are read out continuously by the use of a prescribed clock in the receiver 52. Thus are obtained received output signals.

The transmission and reception of signals are accomplished as described above. The transmission clock which is used in this case is generated by a transmit clock oscillator 67. A frame counter 68 serves to divide this transmit clock to produce a block timing signal 72 and a frame timing signal 73.

The receive logic circuit 65 effects synchronization of system timing by producing a reset signal 71 based on the packet signal received from the master station and forwarding the reset signal 71 to the frame counter 68. This operation will be described in detail afterward.

A transmission control unit 69 effects control of the terminal control unit 53 in accordance with reception signals addressed to its own personal station and derived from the receive logical circuit 65 and, at the same time, controls the transmit logical circuit 62 in accordance with instructions from the terminal control device 53.

A collision detector 74 serves, at the time that the first packet signal is issued on the block selected by its own personal station, to check and confirm whether or not that packet signal has collided with a packet signal issued from some other personal station.

In the method for the synchronization of system timing for the digital signal transmission system of this invention, as the distance codes for the personal stations S, C, and R, those codes which are exclusively related to the respective durations of signal propagation delay time on the coaxial cable 3 are used.

In the first embodiment of the invention, the durations of signals propagation delay time proportionate to the distances from the terminator 2 disposed at the lower end in the diagram of FIG. 4 taken as the datum point to the respective taps $4_1$ through $4_N$ on the upwardly extended coaxial cable 3 are used as distance codes.

Evidently in this arrangement, the lengths of signal propagation delay time between the personal stations are represented by the respective differences between the distance codes of such personal stations. More practically, one bit of the digital signals being transmitted on the coaxial cable 3 may possibly be used as the unit for the distance codes.

For the sake of illustration, let us assume that the distance from the terminator 2 to the tap $4_N$ of the personal station R which verges on occupying the second block #2 to be 100 m (meters) and the distance from the terminator 2 to the tap $4_M$ of the reference station C is 200 m.

It is further assumed that the signal propagation delay time on the coaxial cable 3 is 5 nS (nanoseconds) per meter and the speed of digital signal transmission is 10 Mbps (megabit/second). In this case, therefore, the width of one bit is 100 nS. Thus, the distances 100 m and 200 m correspond to 5-bit width and 10-bit width respectively.

On the assumption that the distances between the personal stations R and C and their respective taps $4_N$ and $4_M$ can be ignored, the distance codes $N_R$ and $N_C$ at the personal station R and C may be represented by the following numbers of bits.

$N_R = 5$ (bits)
$N_C = 10$ (bits)

By the binary code notation, they are represented as follows.

$N_R = 0101$
$N_C = 1010$

When the guard time $T_g$, and the distance codes $N_S$, of the master station S which occupies the first block #1, are similarly represented by bits, the arithmetic operations of the aforementioned formulas, (1) through (4), amount to simple binary operations.

The receive logic circuit 65 is provided with an arithmetic circuit and a programmable timer for computing the front guard time $T_{b9}$. It feeds out the reset signal 71 after elapse of the front guard time $T_{b9}$, from the time at which the reception of reception master S packets is completed.

The reset signal 71, on arrival at the frame counter 68, resets this counter. Consequently, the block timing 72 and the frame timing 73 supplied to the transmit logic circuit 62 are synchronized.

For enhancing the accuracy of this synchronization, decimal fractions may be used to represent the aforementioned distance codes. When the distance from the terminator 2 to the personal station R is 105 m, for example, the distance code $N_R'$ using a decimal fraction is as follows.

$N_R' = 5.25$ (bits) = 0101.01 (binary notation)

By checking the status of data registration in the memory (not shown) disposed within the user device 5, it can be determined whether or not transmission of packet signals is taking place on the coaxial cable 3. When none of the personal stations is transmitting packet signals, any of the personal stations which tries and succeeds in sending out packet signals for the first time sill now serve as a master station to take initiative in the system timing.

The personal station which is first to send out packet signals on the coaxial cable 3 reads out its own distance code from the distance code generator for that station and inserts it in the relevant slot of the distance code bit $b_4$, already explained with reference to FIG. 1. The packet signal produced in the transmit logic circuit 62 is forwarded as a master packet onto the coaxial cable 3 and received by the other personal stations. When this personal station succeeds in sending out the first packet signal, it establishes its position as a master station.

When the personal station trying to send out signals fails to become a master station, the slot $b_4$ is filled with a certain code selected in advance to deny that personal station to be a master station and the packet containing this slot $b_4$ is sent out. The code thus used for conveying the denial may be formed solely of 0's or 1's, for example.

Any of the personal stations other than the master station, therefore, is enabled to tell which one of all the received packets is the master packet by checking the slots $b_4$ of all the packets.

When a given received packet is distinguished to be the master packet, the distance code inserted in the slot $b_4$ of this master packet is transferred to the receive logic circuit 65 illustrated in FIG. 4 to initiate an operation for establishing system timing as will be described fully afterward.

In this invention, for the purpose of enhancing the reliability of the performance of system, it is desirable to adopt a method which effects generation of the reset signal 71 after agreement between the transmitter address code of the master station and that of the master packet received immediately before has been confirmed.

In this case, if the computation of the front guard time is executed after the agreement between the transmitter address codes of the immediately previously received master packet and the currently received master packet has been confirmed, it won't be in time for the issuance of the reset signal 71. This explains why the present invention contemplates executing the computation of the front guard time before the agreement between the two transmitter address codes is confirmed.

To be specific, as soon as the master packet is received, the computation of the front guard time is executed on the basis of the distance code contained in the master packet. Then, if the transmitter address code in the master packet received next agrees with that on which the aforementioned computation has just been executed, the reset signal is generated in accordance with the results of the computation.

If the transmitter address codes in these two master packets do not agree, the front guard time is computed on the basis of the distance code in the newly received master packet. If the transmitter address code in the master packet received next agrees with that in the last received master packet, then the reset signal is generated on the basis of the results of the last computation.

Figure 5:
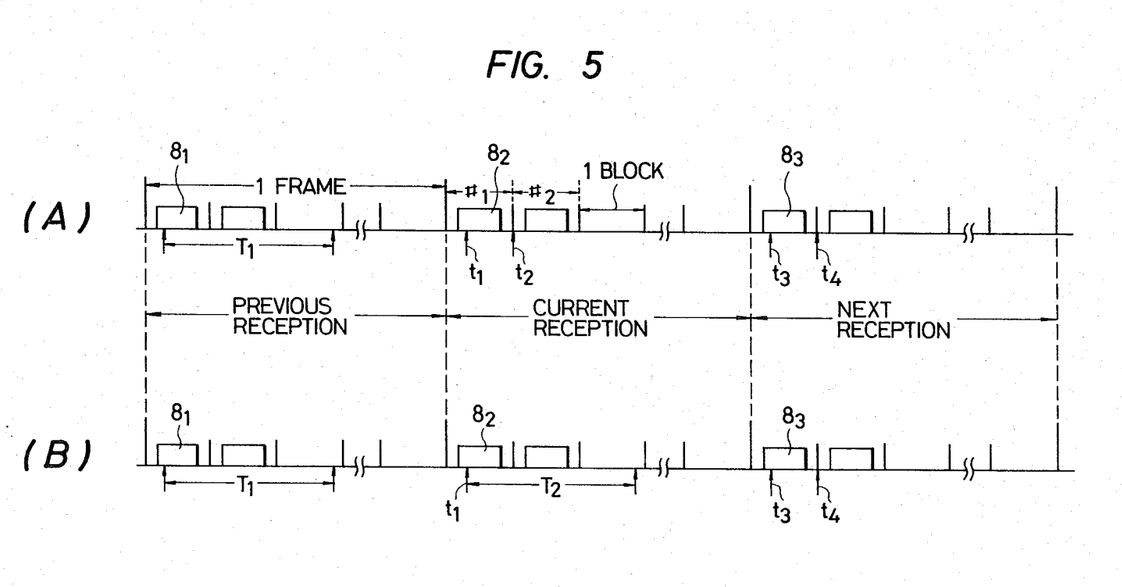

FIG. 5 is a timing diagram for illustrating the method of reset signal issuance described above. In this diagram, the master packet is depicted as occupying the block #1, while in transmission.

The portion (A) of this diagram represents a case wherein the transmitter address codes in the second received (currently received) master packet $8_2$ and that in the first received (previously received) master packet $8_1$ are in agreement. The portion (B) of the diagram represents a case wherein these transmitter address codes are not in agreement but the transmitter address code in the second received (currently received) master packet $8_2$ and that in the third received (next received) master packet $8_3$ are in agreement.

In either of the cases (A) and (B), the computation of the front guard time $T_{b9}$ according to the aforementioned formula (1) is carried out during the computation time T1 on the basis of the distance code of the previously received master packet $8_1$ and the outcome of the computation is committed to temporary storage.

Then in the block #1 of the currently received frame, the transmitter address code temporarily stored during the previous reception and the currently received address code are compared with each other at the timing $t_1$. If they are in agreement, the reset signal is generated at the timing indicated as $t_2$ in (A), namely after elapse of the front guard time $T_{b9}$ from the time of completion of the master packet.

If the aforementioned comparison of the transmitter address codes at the timing $t_1$ reveals lack of agreement between these address codes, the newly received transmitter address code is committed to temporary storage and, at the same time, the computation of the front guard time according to the aforementioned formula (1) is carried out during the computation time T2 indicated in (B) on the basis of the currently received data, with the outcome of this computation put to temporary storage.

Then, the transmitter address code of the next received master packet $8_3$ and that of the currently received master packet $8_2$ are compared with each other at the timing $t_3$. If they agree, then the reset signal is generated at the timing indicated as $t_4$ in (B).

Once the agreement between the transmitter address codes of the master packets is confirmed, the front guard time obtained by the computation performed at that time can be used as it is until a master packet containing a different transmitter address code is received, namely, until the master station changes places.

As noted from FIG. 5 (A), the computation of the front guard time on the basis of the data of the currently received frame may be omitted when the transmitter address codes of the previously and currently received master packets are in agreement and the reset signal is generated at the timing $t_2$.

In this case, in the next received frame, the reset signal is generated at the timing $t_4$ in accordance with the front guard time obtained by the aforementioned computation only on condition that the agreement between the transmitter address code of the next received frame and that of the currently received one is confirmed at the timing t₃.

Further in this case, this confirmation of the agreement between the transmitter address codes at the timing t₃ may be omitted on condition that transmission of the master packet in the same block as in the preceding transmission is confirmed.

Of ciurse, in any of the foregoing cases, one same computation of the front guard time may be carried out upon receipt of each master packet.

Figure 6:
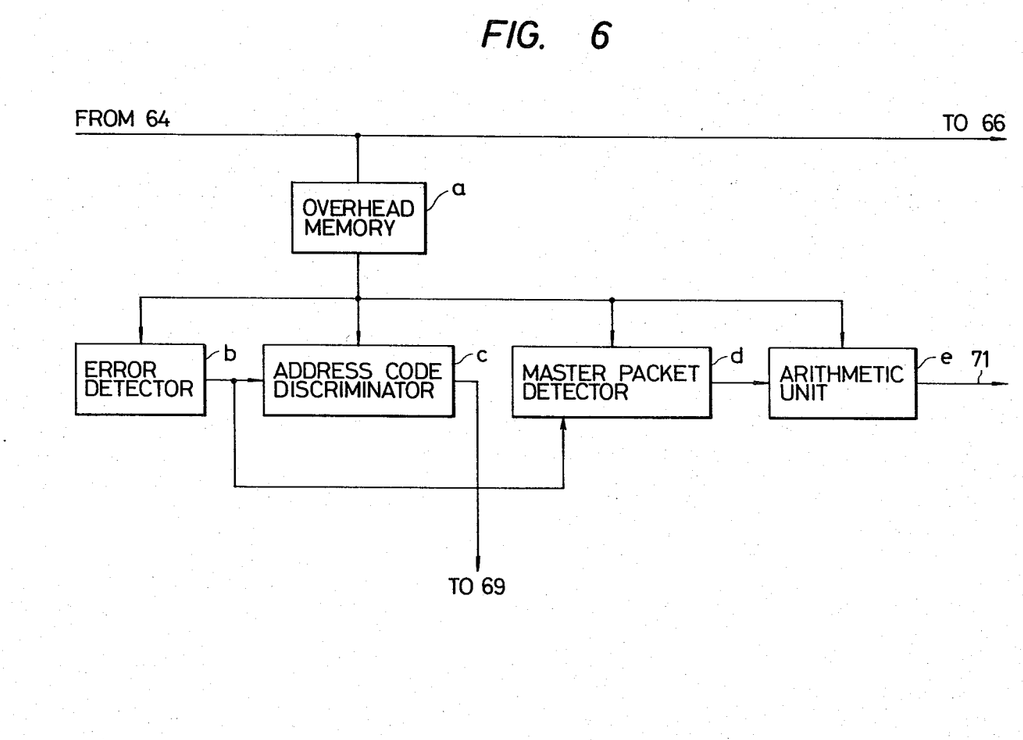
FIG. 6 is a detailed block diagram illustrating a receive logical circuit suitable for working the present invention.

FIG. 6 is a detailed block diagram of the portion of the receive logic circuit 65 of FIG. 4 which has direct bearing upon the present embodiment.

In this diagram, a denotes an overhead memory serving to extract and memorize the overhead bit out of the output of the receive buffer amplifier 64, b an error detector serving to check the reception data for possible code error, and c an address code discriminator serving to check the address code selectively in the address bits of the overhead bits and confirm that this code is addressed to the receiving personal station.

And, d denotes a master packet detector serving to check the received packet and determine whether or not it is a master packet and e an arithmetic circuit for computing the guard time of the formula (1) in accordance with the distance code of the received data and that of the personal station's own and consequently generating the reset signal 71.

When the receive buffer amplifier 64 while in operation issues a reception packet, the overhead bits in this packet are stored in the overhead memory a. The overhead bits thus held in the memory are transferred successively to the error detector b, the address code discriminator c, the master packet detector d, and the arithmetic circuit e.

The error detector b goes over the received overhead bits and determines whether or not any code error has occurred in the bits (as by the technique of parity check) and gives the outcome of the check to the address code discriminator c and the master packet detector d. The address code discriminator c serves to check the address code selectively in the address bits b₄ to conform whether or not this address code agrees with that of the personal station's own and forward the outcome of the check to the transmission control cirquit 69. The master packet detector d serves to check the received packet and confirm whether or not is a master packet and give the outcome of the check to the arithmetic circuit e.

When the received overhead bits contain no code error and the received packet is identified as a master packet, the arithmetic circuit e determines the front guard time $T_{b9}$ by the computation of the aforementioned formula (1) and generates the reset signal 71 after elapse of the aforementioned time $T_{b9}$ from the time of completion of the reception packet. As already pointed out, it is desirable that the computation of the front guard time is performed in the arithmetic circuit e before this circuit receives the output of the master packet detector.

Figure 7:
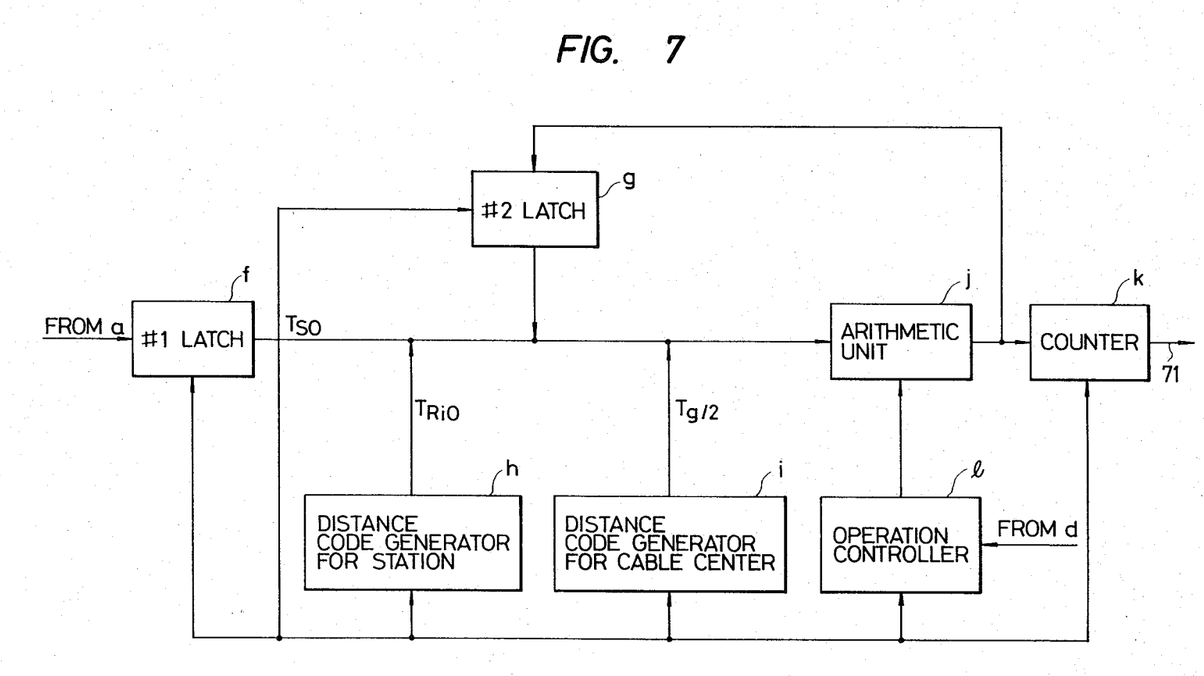
FIG. 7 is a detailed block diagram of the arithmetic circuit shown in the diagram of FIG. 6.

FIG. 7 is a detailed block diagram illustrating a typical example of the arithmetic circuit e of FIG. 6. In this diagram, f denotes a latch #1 for temporarily memorizing the distance code $T_{SO}$ of the master station transferred from the overhead memory a, g a latch #2 for temporarily memorizing the results of the various arithmetic operations described fully afterward, and h a distance code generator for the personal station's own.

And, i denotes a distance code generator for the middle point of the transmission cable, j an arithmetic unit serving to carry out the computation of the formula (1) on the basis of the data of the aforementioned circuit devices f through i and feed out the front guard time $T_{b9}$ as its output, k a counter serving to generate the reset signal 71 on receipt of the front guard time $T_{b9}$, and l an operation controller serving to control the operating timings of the various circuit devices f through k mentioned above.

When the aforementioned conditions for the start of the arithmetic operation are fulfilled and the signal from the master packet detector d (FIG. 6) is delivered to the operation controller l, the computation of the front guard time $T_{b9}$ is started.

The latch #1 f feeds out the distance code $T_{SO}$ of the master station as its output. The arithmetic unit j computes the second term, $|T_{g/2} - T_{SO}|$, of the righthand member of the formula (1) under the timing control by the operation controller l and commits the outcome of the computation to temporary storage in the latch #2 g.

Subsequently, the arithmetic unit j computes the third term, $|T_{SO} - T_{RiO}|$, of the righthand member of the formula (1) and similarly commits the outcome of the computation to temporary storage in the latch #2 g. Finally, the arithmetic unit j carries out the computation of the righthand member of the formula (1) on the basis of the outcomes of the foregoing computations and determines the front guard time $T_{b9}$. The front guard time $T_{b9}$ is transferred to the counter k to induce the generation of the reset signal 71.

Figure 8:
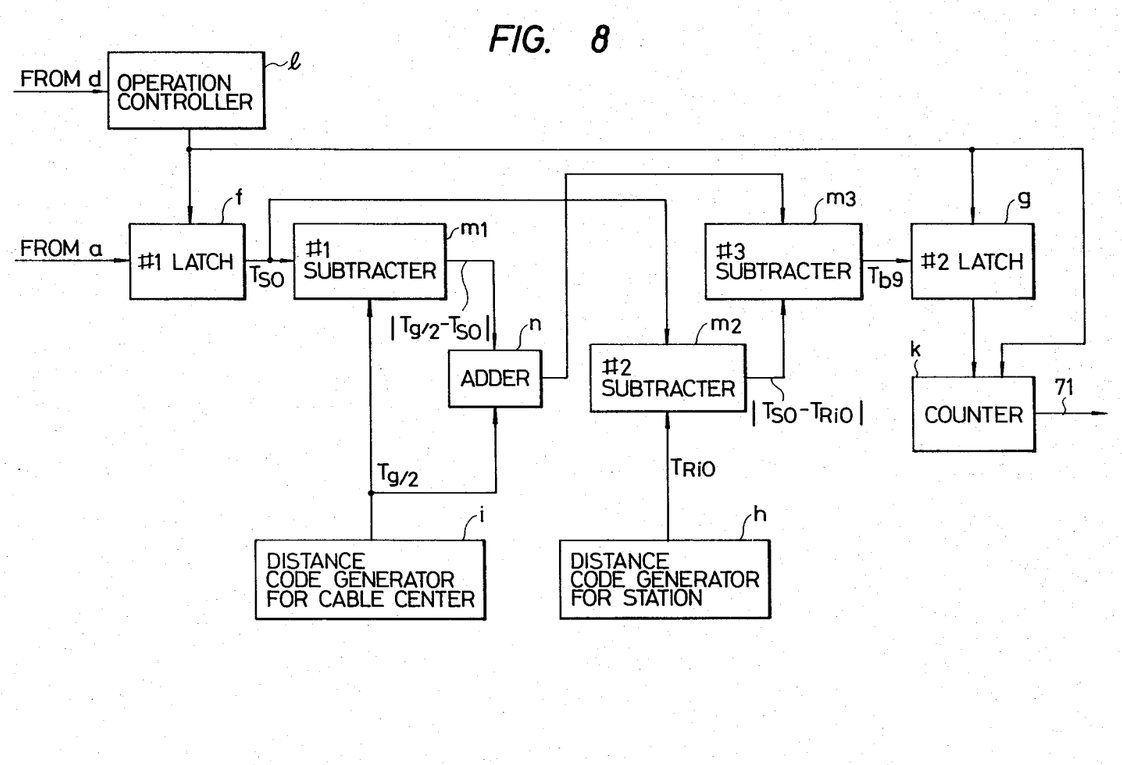
FIG. 8 is a block diagram illustrating a modified arithmetic circuit.

FIG. 8 is a detailed block diagram illustrating another example of the arithmetic circuit e of FIG. 6. In this diagram, the same symbols as used in FIG. 7 denote identical or similar parts.

When the conditions for starting the computation of the formula (1) described above with reference to FIG. 6 are met and the signal from the master packet detector d is delivered to the operation controller l, the computation of the front guard time $T_{b9}$ is started.

Similarly to the arrangement of FIG. 7, the latch #1 f feeds out the distance code $T_{SO}$ of the master station as its output. A first subtracter m1 computes the second term, $|T_{g/2} - T_{SO}|$, of the righthand member of the formula (1) and injects the outcome of the computation into an adder n. The adder n carries out the computation of $\{T_{g/2} - |T_{g/2} - T_{SO}|\}$ and delivers the outcome of this computation to a third subtracter m3.

The second subtracter m2 computes the third term, $|T_{SO} - T_{RiO}|$, of the lefthand member of the formula (1) and supplies the outcome of this computation to the third subtracter m3. The third subtracter m3 carries out the computation of the whole righthand member of the aforementioned formula (1) on the basis of the output of the second substracter m2 and adder n and commits the front guard time $T_{b9}$ to temporary storage in the latch #2 g. The counter k generates the reset signal 71 at a prescribed timing on the basis of the front guard time $T_{b9}$.

As is evident from the foregoing description, the present embodiment of this invention finds no use for any ROM or RAM adapted to memorize the front guard time determined by the relation of position (or distance) of the own personal station with the other personal station or memorize the distance codes of the other personal stations against the relevant address codes and, therefore, entails no extra time and trouble for renewal of the contents of memories even when the personal stations are changed in number or place. Thus, the present embodiment permits simplification of the personal stations and warrants reduction in the equipment cost.

Figure 9:
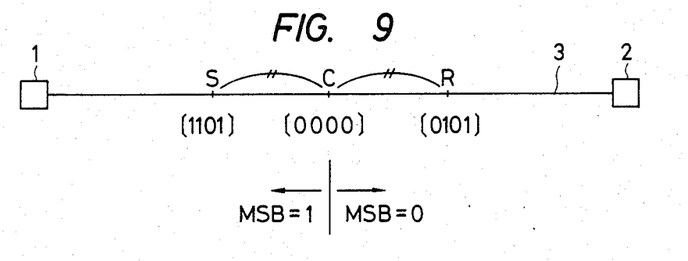
FIG. 9 is an explanatory diagram showing the relation between the points of location of the personal stations on the coaxial cable and the distance codes to be used in the present invention.

In the embodiment described above, the terminator 2 is used as the datum point for the distance codes of the personal stations. Alternatively, the personal station C which is located at the middle point of the coaxial cable 3 may be used as the datum point as illustrated in FIG. 9. An embodiment of the invention which uses this datum point will be described below.

The distance code of the central station C is represented as "0000" in the binary notation. The positions of the personal stations connected to the coaxial cable 3 are defined each by the direction and distance from the datum point.

Figure 10:
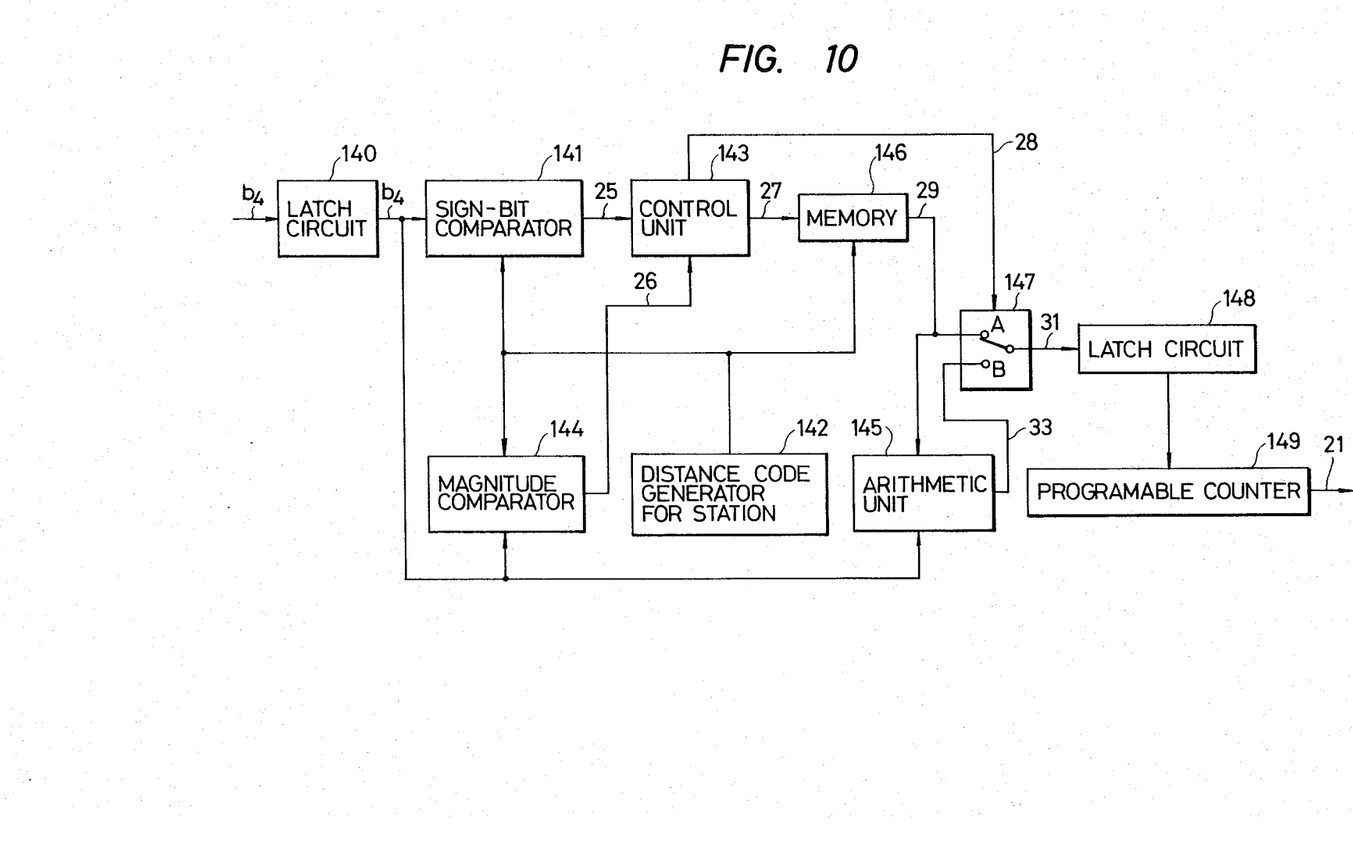
FIG. 10 is a block diagram illustrating an essential part of a receive logical circuit suitable for use in a second embodiment of this invention.

First as regards the direction, the most significant bit (MSB) of the distance code is assigned as a sign bit. The personal stations located to the right of the central station C and those located to the left are given dissimilar signs. Specifically in the present embodiment, the code "0" is used to designate the location to the right of the central station and the code "1" the location to the left respectively. The remaining three digits of the distance code of the binary notation are used to designate the distance of a given personal station from the datum point. As in the preceding embodiment, it is convenient in the present embodiment to adopt as the unit of distance the distance of the coaxial cable 3 which equals one bit of delay caused in the digital signal transmitted on the cable. Now for the convenience of description, it is assumed that the personal stations S and R are both located at a distance of 100 m (meters) and the numerical values such as of the propagation delay time of the signals on the coaxial cable 3 are the same as those involved in the first embodiment. It is further assumed that the distance code of the personal station is designated as N(S) and that of the personal station R as N(R). Then, these distance codes will have the following binary values.

N(S)=1101
N(R)=0101

In this manner, the personal stations connected to the coaxial cable 3 are given their respective distance codes. Each personal station has its own distance code set in the distance code generator 142 (FIG. 10) of its own. A binary number setting switch device such as the dip switch may be used as the distance code generator.

FIG. 10 represents the essential part of a receive logical circuit 65 suitable for use in the present embodiment. The distance bit $b_4$ of the master packet is supplied to and retained at a latch 140. As the latch has stored the distance bit, a sign-bit comparator 141 compares the sign bit of the distance code set in the distance code generator 142 with the sign bit of the master packet. The outcome of this comparison is supplied as the first arithmetic expression designation signal 25 to a control unit 143.

In the meantime, the distance bit $b_4$ of the master packet 1s supplied also to a magnitude comparator 144 and an arithmetic unit 145. The magnitude comparator 144 compares the portion of the distance code minus the sign bit of the own personal station with that of the master station. It supplies the outcome of this comparison as the second arithmetic expression designation signal 26 to the control unit 143.

The control unit, based on the received signals, supplies an address signal 27 to a memory 146 and a selection signal 28 to a switching unit 147.

First, as the first arithmetic expression designation signal 25, a signal indicating that the aforementioned two sign bits have dissimilar signs is supplied to the control unit 143. In this case, the control unit 143 feeds out the address signal 27 serving to designate the outcome of the computation of the formula (2) and the selection signal 28 serving to select the A contact side of the switching unit 147 as its outputs. In the memory 146, the outcomes of the computations of the formula (2) and the formula (3) (front guard time) are stored in the form of a table.

The memory 146, on receiving the address signal 27 serving to designate the outcome of the computation of the formula (2), selects the front guard time $T_{b9}$ of the own personal station in accordance with the formula (2) with reference to the distance code of the own personal station fed from the distance code generator 142 for the own personal station and then feeds out the outcome of this computation as the read signal 29. The switching unit 147 is adapted so as to receive the read signal 29 through the A contact and feed out the selected status of the A contact as an output signal 31 to a latch circuit 148.

The latch circuit 148 retains the output signal 31 corresponding to the front guard time $T_{b9}$ and feeds it to a programmable counter 149. The programmable counter 149 starts counting the front guard time $T_{b9}$ at the time that the reception of the master packet is completed and then generates the reset signal 21 after elapse of the front guard time. This reset signal 21 is supplied to a frame counter 68 illustrated in FIG. 4 and used to reset this frame counter 68. Thus, synchronization of system timing is obtained.

Now, the case wherein a signal designating that the two sets of sign bits have been found by comparison to possess one same sign is supplied as the first arithmetic expression designation signal 25 to the control unit 143 will be described.

In this case, the control unit 146, based on the status of the second arithmetic expression designation signal 26, determines whether the formula (3) should be selected or the formula (4) should be selected. To be specific, it selects the formula (3) where the distance code of the master station is greater in magnitude than the distance code of the own personal station. Otherwise, it selects the formula (4).

When the formula (3) is selected, the control unit 143 feeds out the signal designating the outcome of the computation of the formula (3) as the address signal 27. At the same time, it feeds out the signal designating the selection of the A contact side as the selection signal 28. The memory 146, based on these signals, feeds out the front guard time $T_{b9}$ of the own personal station in accordance with the formula (3) as the read signal 29. This front guard time $T_{b9}$ is supplied as an output signal 31 from the switching unit to the latch circuit 148. Consequently, there ensues an operation for the synchronization of system timing as in the former case.

Finally when the formula (4) is selected, the control unit 143 feeds out a signal designating the outcome of the computation of the formula (2) as the address signal 27. At the same time, it also feeds out a signal designating the selection of the B contact side as the selection signal 28. The read signal 29 fed out of the memory 146 is supplied to the arithmetic unit 146. The arithmetic unit 145 is a device for computing the formula (4). The front guard time indicated by the formula (4) may be modified as shown below.

$$T_{b9} = T_g/2 + T_{SC} - (T_{CR1} - T_{SC}) \quad (5)$$
$$= (T_g/2 - T_{CR1}) + 2T_{SC}$$

It is noted from the modification of the formula, the arithmetic unit 145 can compute the formula (4) by computing a length twice the distance represented by the distance code of the master station minus MSB and adding the outcome of this computation to the read signal 29.

The outcome of the computation of the formula (4) is supplied as a signal 33 of the arithmetic result to the B contact of the switching unit 147 and as an output signal 31 of the switching unit to the latch circuit 148. Consequently, there ensues an operation for the synchronization of system timing as in the preceding case.

In the present embodiment, since the memory 146 is designed to memorize the results of the computations of the formulas (2) and (3) with respect to the individual personal stations in the form of a table as described above, the personal stations are allowed to use memories of identical contents and, therefore, are produced with ease. For personal stations not yet installed in the system, the results of the same computations to be obtained with respect to their planned positions on the transmission cable can be memorized in the existing memories. When new personal stations are added to the existing ones or the positions of any of the existing personal stations are changed in the future, therefore, the values of front guard time for the newly added personal stations or for the personal stations having changed positions can be computed without requiring any alteration in the contents of the existing memories.

Figure 11:
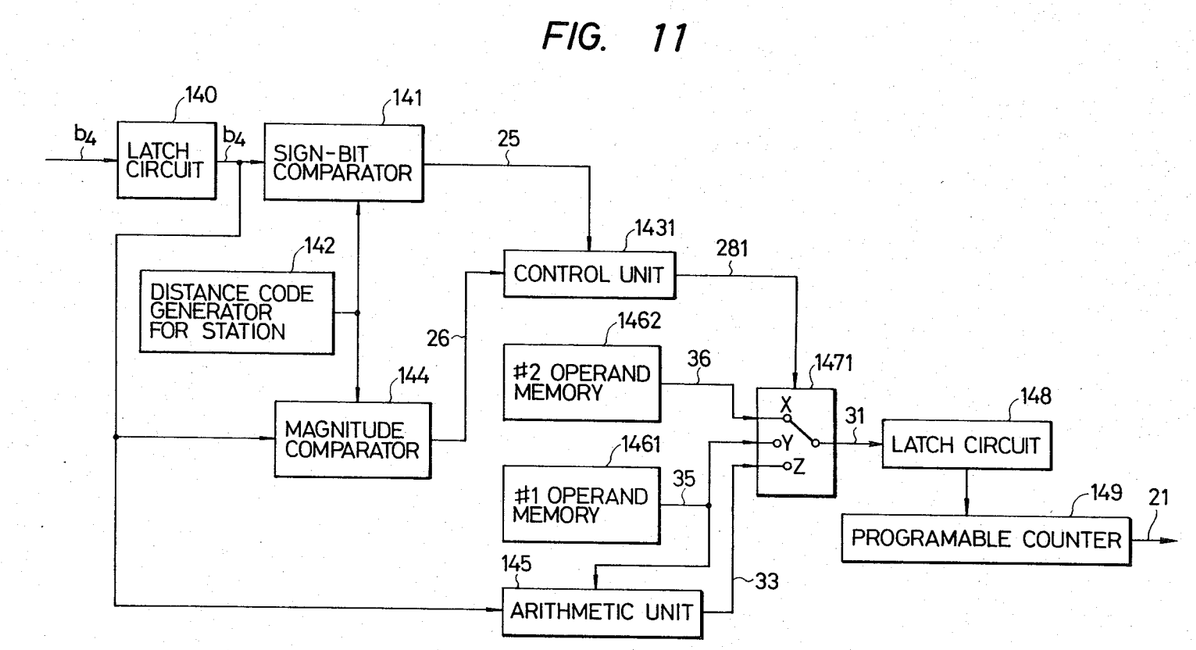
FIG. 11 is a block diagram illustrating a typical modification of the receive logical circuit of FIG. 10.

FIG. 11 represents a typical modification to the receive logic circuit described above. The parts of the modified logic circuit which find identical countertypes in FIG. 10 are denotes by the same symbols. The description of these parts is either simplified or omitted.

This modified embodiment is provided with first and second operand memories 1461, 1462 in the place of memory 146. These operand memories are formed of such devices as dip switches and, therefore, are enabled to generate the values of front guard time $T_{b9}$ of the own personal stations. During the installation of a given personal station, the worker engaging in the installation computes the front guard time $T_{b9}$ of this particular personal station in accordance with the formula (2) and the formula (3). The outcome of the computation of the formula (2) is set in the first operand memory 1461 and that of the computation of the formula (3) in the second operand memory 1461 respectively.

A control unit 1431 resembles the control circuit 143 illustrated in FIG. 10. It selects the applicable formula of computation on the basis of the combination of the first arithmetic expression designation signal 25 and the second arithmetic expression designation signal 26 and, accordingly, feeds out a selection signal 281 for permitting selection of one out of three signals. The selection signal 281 is supplied to the switching unit 1471.

When the formula (2) is selected in accordance with the selection signal 281, the Y contact of the switching unit 1471 is selected and the signal 35 of arithmetic result fed out by the first operand memory 1461 is supplied as the output signal 31 to the latch circuit 148. When the formula (3) is selected instead, the X contact of the switching unit 1471 is selected and the signal 36 of arithmetic result fed out by the second operand memory 1462 is supplied as the output signal 31 to the latch circuit 148. When the formula (4) or the formula (5) is selected, the Z contact of the switching unit 1471 is selected.

The arithmetic unit 145 takes in the signal 35 of arithmetic result and the distance bit $b_4$ of the master packet as its inputs and feeds out the signal 33 of arithmetic result as its output. The signal 33 of arithmetic result is supplied as the output signal 31 from the switching unit to the latch circuit 148 when the Z contact of the switching unit 1471 is selected.

As described above, a varying front guard time $T_{b9}$ is retained in the latch circuit 148 to suit the particular occasion, with the result that the programmable counter 149 will issue the reset signal 21 needed for the synchronization of system timing.

In accordance with this modified embodiment, when a new personal station is added to the existing system or any of the personal stations is moved to a new position within the system, the front guard time for this particular personal station can be easily established simply by having this personal station provided with an operand memory of its own.

In the preceding embodiment, the actual middle point of the transmission cable is established as the datum point. Optionally, the opposite ends of the transmission cable may be established as datum points. The adoption of the opposite ends of the cables as the datum points is essentially similar to the adoption of the middle point of the cable as the datum point and brings about the same effect. Further, the middle point of the transmission cable need not be exact literally.

The point on the transmission cable which is positioned from one end of the cable by a distance equal to not more than one half the guard time Tg for the issuance of the packet signal may be used as the middle point of this invention.

As described above, since the present embodiment accomplishes synchronization of system timing in accordance with the distance information of the master station based on the substantially middle point of the transmission cable as the datum point, the personal stations are not required to possess their own conversion tables designed for synchronization and the system as a whole operates advantageously with memories or semi-stationary memory devices of relatively small capacity. Moreover, the units used for performing computations of synchronization are enabled to operate with a simple principle and the lengths of processing time are allowed to shorten.

What is claimed is:

1. A digital signal transmission system for effecting time-division multiplexing/circuit switching transmission and reception of signals in the form of packets among a multiplicity of personal stations by causing digital signals transferred on a transmission cable to be fixedly positioned within periodically repeating frames along a time axis and further dividing each of the frames on said time axis into unit blocks thereby providing said personal stations with chances for digital signal transmissions, the multiplicity of personal stations including a master station which establishes system timing, the digital signal transmission system being characterized by the master station issuing a packet which incorporates therein a distance code and the other personal stations issuing packets which do not incorporate therein said distance code, said distance code being exclusively related to a time for signal propagation from a predetermined datum point located along the transmission cable to the master station on the transmission cable.

2. A digital signal transmission system according to claim 1, wherein the datum point is a substantially middle point of the transmission cable.

3. A digital signal transmission system according to claim 1, wherein the datum point is one end of the transmission cable.

4. A digital signal transmission system according to claim 1, wherein one bit width of the digital signal being transmitted on the transmission cable is selected as a unit of distance code.

5. A digital signal transmission system for effecting time-division multiplexing/circuit switching transmission and reception of signals in the form of packets along a multiplicity of personal stations by causing digital signals transferred on a transmission cable to be fixedly positioned within periodically repeating frames along a time axis and further dividing each of the frames on said time axis into unit blocks thereby providing said personal stations with chances for digital signal transmission, the multiplicity of personal stations including a master station which establishes system timing, the digital signal transmission system being characterized by each of the personal stations having means for retaining a first distance code of that station and a second middle-point distance code of the transmission cable; means for establishing, upon receipt of the packet issued from the master station, system timing on the basis of said first and second distance codes and a distance code contained in the packet from said master station; and means for determining timing for issuance of a packet from that station.

6. A digital signal transmission system according to claim 5, wherein one bit width of the digital signal being transmitted on the transmission cable is selected as a unit of distance code.

7. A digital signal transmission system according to claim 5, wherein the personal stations other than the master station, upon reception of a packet, are each enabled to discern whether or not this packet has issued from the master station by checking the packet and determining whether or not the packet incorporates therein the distance code.

8. A digital signal transmission system according to claim 5, wherein the personal stations other than the master station, upon reception of two successive packets from the master station, are each enabled to establish system timing after a transmitter address code in the second packet has been confirmed to be identical with that in the first packet.

9. A digital signal transmission system according to claim 5, wherein the personal stations other than the master station, upon reception of the packet from the master station, are each enabled to start computing the timing for issuance of a packet from that station before a transmitter address code in said packet has been confirmed to be identical with an immediately previously received transmitter address code and, after the two transmitter address codes have been confirmed to be identical, establish system timing on the basis of the outcome of said computation.

10. A digital signal transmission system according to claim 5, wherein a distance code equivalent to a time of not more than one half a guard time for the time of issuance of a packet is used as the distance code of the middle point of the transmission cable.

11. A digital signal transmission system according to claim 5, and 10, wherein the personal stations other than the master station, after having confirmed the master packet, namely the particular personal station transmitting the reception master packet, are each enabled to avoid performing the works of confirming the master station and computing the system timing, adopt the block being used by the master packet as a master block and keep watch on subsequent occurrence of another master packet.

12. A digital signal transmission system according to claim 11, wherein the personal stations other than the master station, after the master block has been established, are each enabled to establish system timing on the basis of the outcome of the computation performed at the time of confirmation of the master station.

* * * * *